(12) United States Patent
Matsumura

(10) Patent No.: US 11,820,204 B2
(45) Date of Patent: *Nov. 21, 2023

(54) ROTARY APPARATUS

(71) Applicant: MINEBEA MITSUMI INC., Nagano (JP)

(72) Inventor: Yukimasa Matsumura, Kikugawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,667

(22) Filed: Sep. 9, 2022

(65) Prior Publication Data
US 2023/0001768 A1 Jan. 5, 2023

Related U.S. Application Data

(63) Continuation of application No. 17/060,714, filed on Oct. 1, 2020, now Pat. No. 11,472,267, which is a (Continued)

(30) Foreign Application Priority Data

Jun. 17, 2016 (JP) .................................. 2016-120647

(51) Int. Cl.
*B60H 1/34* (2006.01)
*B60H 1/00* (2006.01)
*F24F 13/15* (2006.01)

(52) U.S. Cl.
CPC ........... *B60H 1/34* (2013.01); *B60H 1/00842* (2013.01); *B60H 1/00857* (2013.01); (Continued)

(58) Field of Classification Search
CPC .. B60H 1/34; B60H 1/00842; B60H 1/00857; B60H 2001/006; B60H 2001/3471; F24F 13/15; H02K 5/24
See application file for complete search history.

(56) References Cited

U.S. PATENT DOCUMENTS 1,634,441 A 7/1927 Baur
3,043,090 A 7/1962 Sundt
(Continued)

FOREIGN PATENT DOCUMENTS

CN 1160265 A 9/1997
CN 1694334 A 11/2005
(Continued)

OTHER PUBLICATIONS

Aug. 21, 2018 Office Action issued in Japanese Patent Application No. 2016-120647.
(Continued)

*Primary Examiner* — Edelmira Bosques
*Assistant Examiner* — Michael James Giordano
(74) *Attorney, Agent, or Firm* — Oliff PLC

(57) ABSTRACT

A rotary apparatus includes a motor, a plurality of gears including an output gear, and a housing accommodating the plurality of gears and the motor. The housing includes a first surface portion, a second surface portion facing the first surface portion and spaced apart from the first surface portion, and a sidewall portion provided at an outer peripheral portion of the first surface portion and the second surface portion and supporting the first surface portion and the second surface portion. One of the first surface portion and the second surface portion includes a vibration damping part opposing the output gear.

4 Claims, 6 Drawing Sheets

Related U.S. Application Data continuation of application No. 15/620,035, filed on Jun. 12, 2017, now Pat. No. 10,836,237.

(52) U.S. Cl.
CPC .............. B60H 2001/006 (2013.01); B60H 2001/3471 (2013.01); F24F 13/15 (2013.01)

(56) References Cited

U.S. PATENT DOCUMENTS

| | | | |
|---|---|---|---|
| 3,199,728 A | | 8/1965 | Taylor et al. |
| 3,480,934 A | | 11/1969 | Miller et al. |
| 4,982,300 A | | 1/1991 | Forbord |
| 5,386,163 A | | 1/1995 | Heilman |
| 5,453,649 A | | 9/1995 | Blanchet |
| 5,677,813 A | | 10/1997 | Yoshida et al. |
| 5,937,507 A | | 8/1999 | Asakura et al. |
| 6,028,384 A | | 2/2000 | Billman et al. |
| 6,505,807 B1 | | 1/2003 | Nolting et al. |
| 6,802,768 B2 | | 10/2004 | Stevenson et al. |
| 7,070,117 B2 | | 7/2006 | Kook |
| 7,291,951 B2 | | 11/2007 | Takiguchi et al. |
| 7,390,179 B2 | | 6/2008 | Reinhart et al. |
| 7,510,164 B2 | | 3/2009 | Geroux et al. |
| 7,573,167 B2 | | 8/2009 | Miyamoto et al. |
| D707,739 S | | 6/2014 | Wada et al. |
| 8,957,559 B2 | | 2/2015 | Schneider et al. |
| 9,644,704 B2 | | 5/2017 | Weber et al. |
| 9,985,495 B2 | | 5/2018 | Beetz et al. |
| 10,337,533 B2 | | 7/2019 | Ozawa |
| 2002/0111241 A1* | | 8/2002 | Kujira ............... F16H 37/041 475/149 |
| 2002/0130567 A1 | | 9/2002 | Kujira |
| 2002/0158527 A1 | | 10/2002 | Kawakami et al. |
| 2003/0008746 A1 | | 1/2003 | Meier et al. |
| 2003/0220066 A1 | | 11/2003 | Stevenson et al. |
| 2004/0164629 A1 | | 8/2004 | Kawakami et al. |
| 2006/0038106 A1 | | 2/2006 | Geroux et al. |
| 2006/0055258 A1 | | 3/2006 | Tsergas |
| 2007/0175518 A1 | | 8/2007 | Vincent et al. |
| 2007/0226939 A1 | | 10/2007 | Takada |
| 2008/0224553 A1 | | 9/2008 | Abe et al. |
| 2008/0257086 A1 | | 10/2008 | Noritake |
| 2009/0115270 A1* | | 5/2009 | Huang ............... H02K 11/33 310/71 |
| 2012/0098364 A1 | | 4/2012 | Inoue |
| 2012/0139371 A1 | | 6/2012 | Gottschalk et al. |
| 2013/0104682 A1 | | 5/2013 | Schneider |
| 2013/0123056 A1 | | 5/2013 | Ishida |
| 2013/0186724 A1 | | 7/2013 | Miyahara et al. |
| 2013/0231195 A1 | | 9/2013 | Takenaka |
| 2014/0209781 A1 | | 7/2014 | Weber et al. |
| 2015/0108860 A1 | | 4/2015 | Shibata et al. |
| 2015/0381016 A1 | | 12/2015 | Tsuda et al. |
| 2017/0117773 A1 | | 4/2017 | Beetz et al. |
| 2018/0034345 A1 | | 2/2018 | Hirabayashi et al. |
| 2019/0386539 A1 | | 12/2019 | Mukai |

FOREIGN PATENT DOCUMENTS

| | | |
|---|---|---|
| CN | 101045447 A | 10/2007 |
| CN | 102575744 A | 7/2012 |
| CN | 103210238 A | 7/2013 |
| CN | 203285233 U | 11/2013 |
| CN | 103973024 A | 8/2014 |
| CN | 104578554 A | 4/2015 |
| CN | 105099058 A | 11/2015 |
| DE | 10125581 A1 | 12/2002 |
| FR | 2699758 A1 | 6/1994 |
| JP | S54-123668 U | 8/1979 |
| JP | S60-035934 A | 2/1985 |
| JP | S62-140240 U | 9/1987 |
| JP | H5-219715 A | 8/1993 |
| JP | H5-252705 A | 9/1993 |
| JP | H06-038469 A | 2/1994 |
| JP | H7-154940 A | 6/1995 |
| JP | H9-167481 A | 6/1997 |
| JP | H9-322469 A | 12/1997 |
| JP | 2000-060059 A | 2/2000 |
| JP | 2003-278784 A | 10/2003 |
| JP | 2006-094625 A | 4/2006 |
| JP | 2007-192349 A | 8/2007 |
| JP | 2011-200025 A | 10/2011 |
| JP | 2012-083181 A | 4/2012 |
| JP | 2013-005512 A | 1/2013 |
| JP | 2013-219999 A | 10/2013 |
| JP | 2013-251941 A | 12/2013 |
| JP | 2014-155417 A | 8/2014 |
| JP | 2014-171365 A | 9/2014 |
| JP | 2015-220969 A | 12/2015 |
| JP | 2017-2762 A | 1/2017 |
| KR | 20090080722 A | 7/2009 |

OTHER PUBLICATIONS

Jun. 18, 2019 Decision to Grant a Patent issued in Japanese Patent Application No. 2018-167553.
Oct. 28, 2019 Office Action issued in Chinese Patent Application No. 201710441893.7.
Nov. 6, 2019 Information Offer Form issued in Japanese Patent Application No. 2016-120647.
Nov. 6, 2019 Information Offer Form issued in Japanese Patent Application No. 2018-167553.
May 15, 2020 Office Action issued in Chinese Patent Application No. 201710441893.7.
May 19, 2020 Office Action issued in Japanese Patent Application No. 2020-041818.
Jul. 7, 2020 Office Action issued in Japanese Patent Application No. 2019-132149.
Nov. 3, 2021 Office Action issued in Chinese Patent Application No. 202010193416.5.
Nov. 10, 2021 Office Action issued in Chinese Patent Application No. 202010193401.9.
Nov. 16, 2021 Office Action issued in Japanese Patent Application No. 2020-202721.

* cited by examiner

ROTARY APPARATUS

CROSS REFERENCE TO RELATED APPLICATIONS

This application is a continuation application of U.S. patent application Ser. No. 17/060,714, filed Oct. 1, 2020, which is a continuation application of U.S. patent application Ser. No. 15/620,035, filed Jun. 12, 2017, which claims the benefit of Japanese Patent Application No. 2016-120647, filed Jun. 17, 2016. Each reference is hereby incorporated by reference in its entirety.

BACKGROUND

Technical Field

The present disclosure relates to a rotary apparatus.

Background

For example, Japanese Patent Laid-Open No. 2015-220969 discloses a motor actuator (rotary apparatus) that drives a plurality of doors (louvers) provided in an air passage for flowing air of a vehicle air conditioning system.

Recent years have seen a tendency toward increased quietness in an intra-vehicle environment. For example, a motor-driven vehicle such as an electric car emits no noise from an internal-combustion engine and thus the inside of the vehicle is remarkably quiet.

Such high degree of quietness emphasizes noise which otherwise would not be noticeable inside a car equipped with an internal combustion engine, and thus a higher degree of low noise than ever before is considered to be required even in various parts of the car.

SUMMARY

The present disclosure is related to providing a rotary apparatus with lower noise.

In accordance with one aspect of the present disclosure, (1) a rotary apparatus including a motor, a plurality of gears including an output gear, and a housing accommodating the plurality of gears and the motor, wherein the housing includes a first surface portion, a second surface portion facing the first surface portion and spaced apart from the first surface portion, and a sidewall portion provided in an outer peripheral portion of the first surface portion and the second surface portion and supporting the first surface portion and the second surface portion, and one of the first surface portion and the second surface portion includes a vibration damping part opposing the output gear.

(2) In the configuration of (1) above, the vibration damping part is a projecting portion projecting into the housing from the surface portion and increasing weight of the surface portion.

(3) In the configuration of (2) above, the projecting portion comprises a plurality of protruded portions projecting into the housing from the surface portion.

(4) In the configuration of (2) above, the projecting portion is an attachment member attached in the housing, the attachment member projects into the housing from the surface portion.

(5) In the configuration of (4) above, the housing is formed with a resin material, and the attachment member is formed with a metal material.

(6) In the configuration of any one of (2) to (5) above, the output gear has a recessed portion, and a part of the projecting portion is accommodated in the recessed portion of the output gear.

(7) In the configuration of (1) above, the surface portion includes an opening portion facing the output gear, the vibration damping part is a tubular wall portion increasing weight of the surface portion, the tubular wall portion projecting into the housing from the surface portion, and the tubular wall portion surrounds the opening portion.

(8) In the configuration of (7) above, the tubular wall portion is a first wall portion, the surface portion includes a second wall portion surrounding the opening portion and the second wall portion is tubular, the second wall portion is surrounded by the first wall portion, and the surface portion includes a plurality of ribs connecting the first wall portion and the second wall portion.

(9) In the configuration of any one of (1) to (8) above, the vibration damping part is an increased thickness portion having a thickness greater than a basic thickness of the surface portion and a weight greater than a weight of the surface portion.

(10) In the configuration of (9) above, the thickness of the increased thickness portion increases from the surface portion toward outside the housing.

According to the present disclosure, a rotary apparatus with low noise can be provided.

DETAILED DESCRIPTION

Figure 1B:
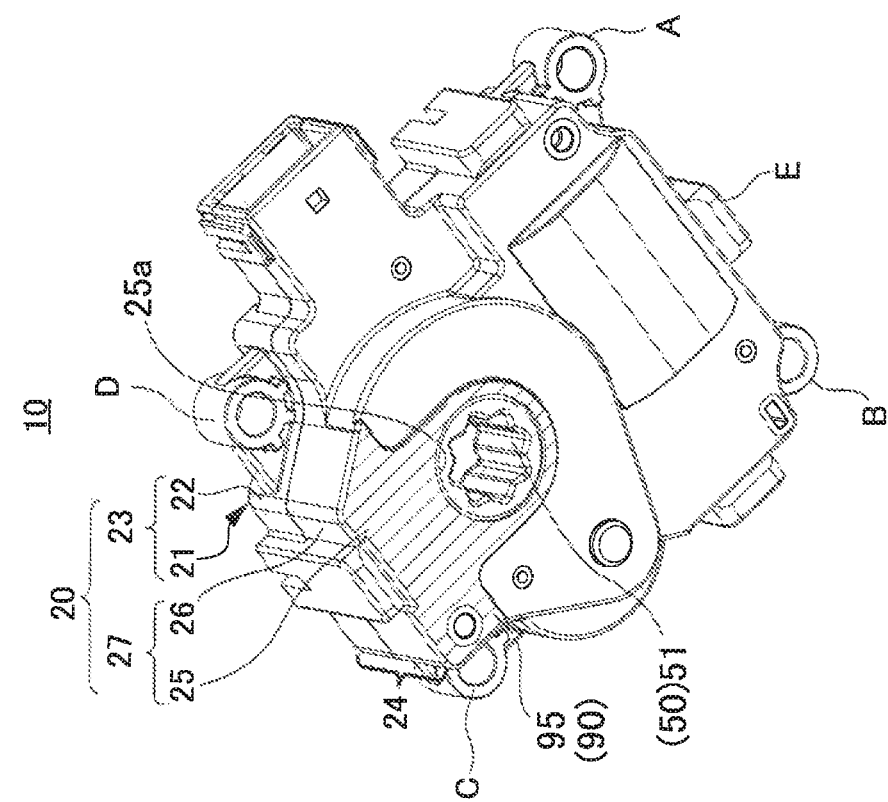
FIG. 1B is a perspective view of the rotary apparatus of the first embodiment of the present disclosure seen from a second surface portion side of the housing.

Hereinafter, the modes for practicing the disclosure (hereinafter referred to as "embodiments") will be described in detail with reference to the accompanying drawings.

It should be noted that throughout the description of the embodiments, the same reference numerals or characters are assigned to the same components.

First Embodiment

Figure 1A:
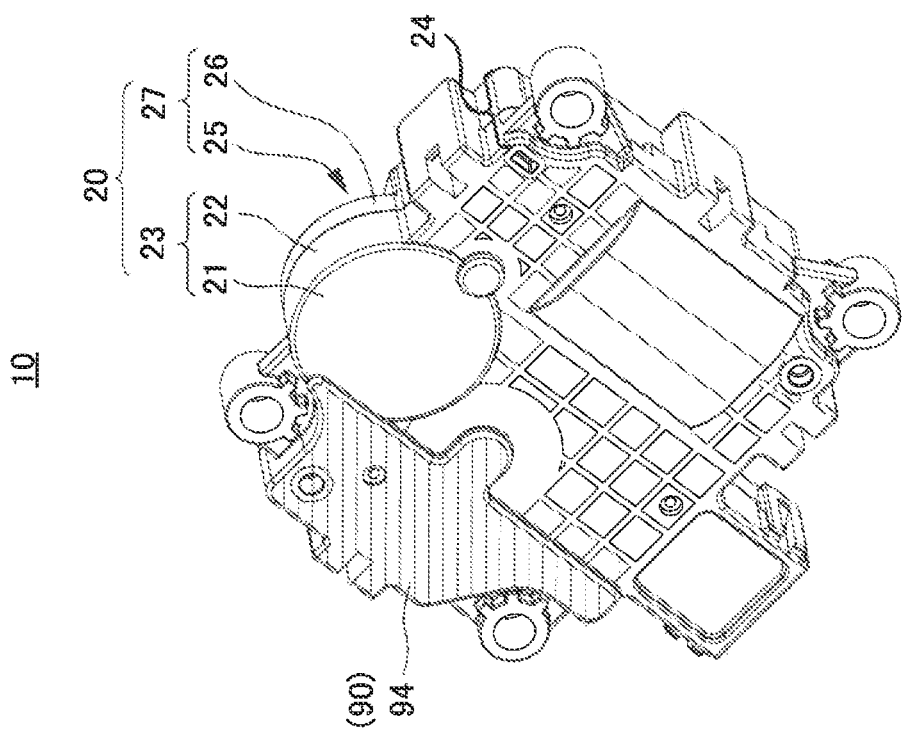
FIG. 1A is a perspective view of a rotary apparatus of a first embodiment of the present disclosure seen from a first surface portion side of a housing.

FIG. 1A is a perspective view of a rotary apparatus 10 of a first embodiment of the present disclosure seen from a first surface portion 21 side of a housing 20, and FIG. 1B is a perspective view of a rotary apparatus 10 of a first embodiment of the present disclosure seen from a second surface portion 25 side of the housing 20.

Figure 2:
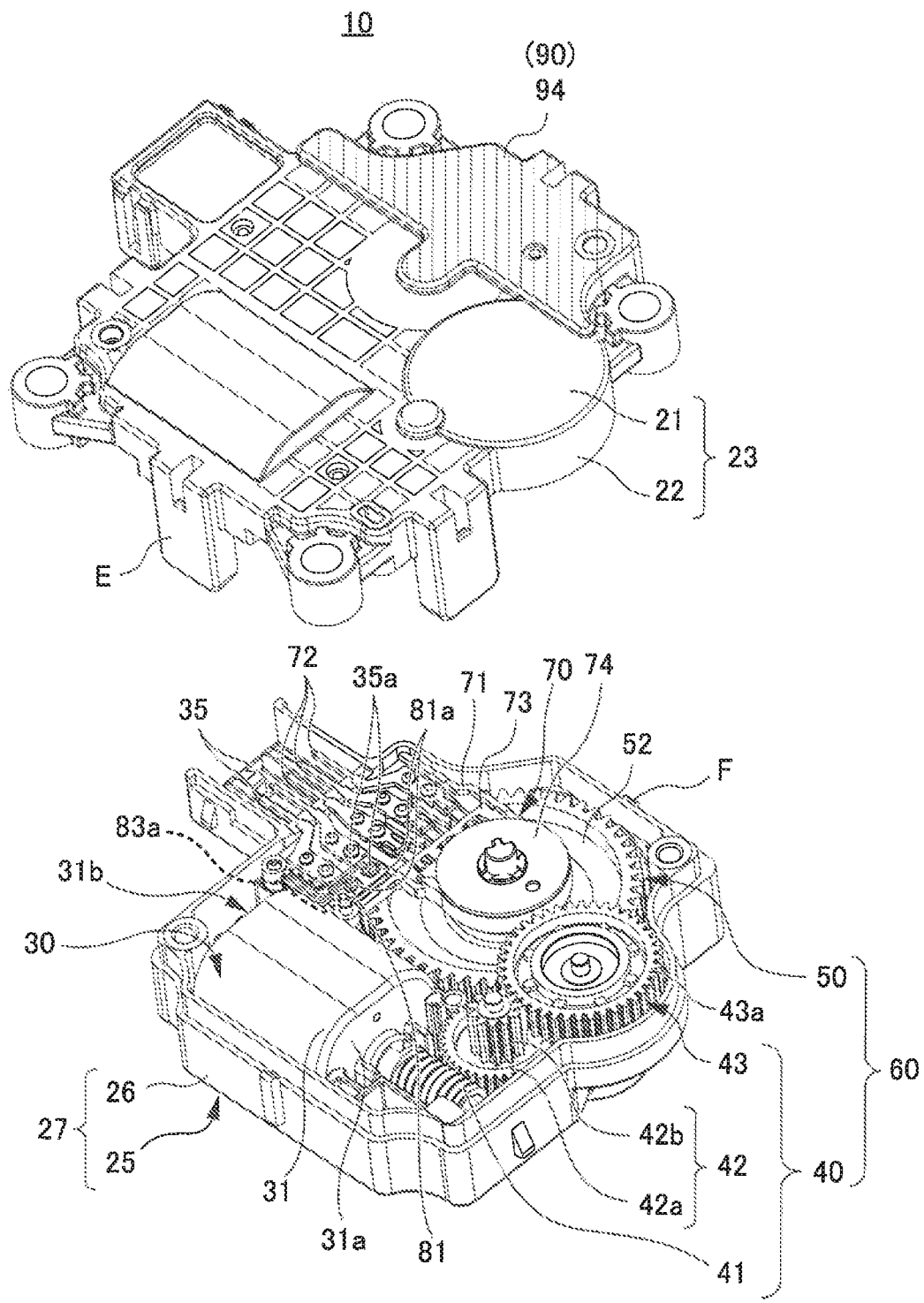
FIG. 2 is a perspective view of the rotary apparatus of the first embodiment of the present disclosure with a first housing being detached.
Figure 3:
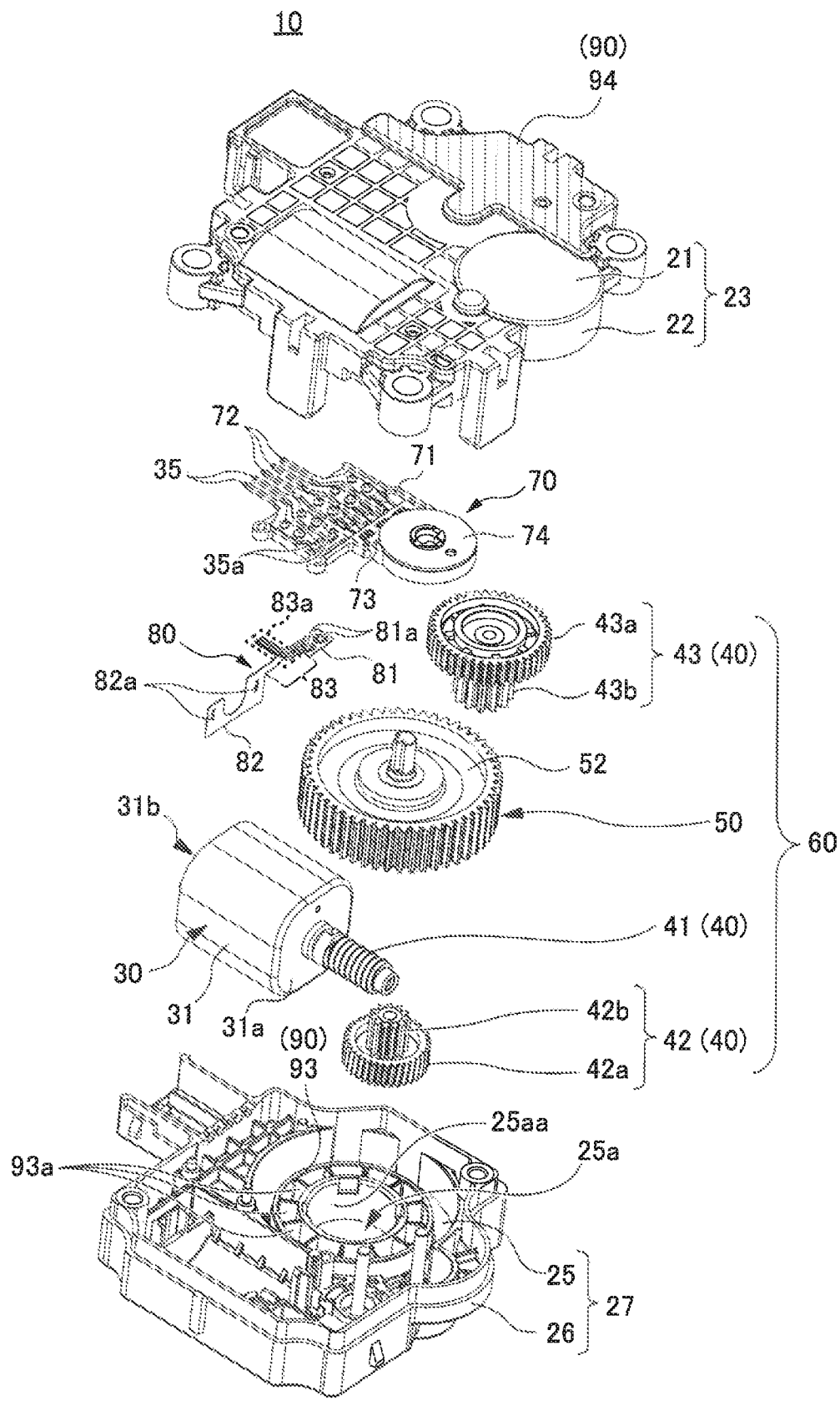
FIG. 3 is an exploded perspective view of the rotary apparatus of the first embodiment of the present disclosure.

FIG. 2 is a perspective view of the rotary apparatus 10 with a first housing 23 being removed. FIG. 3 is an exploded perspective view of the rotary apparatus 10.

As illustrated in FIGS. 1A and 1B, the rotary apparatus 10 includes a first surface portion 21 as a surface portion, a second surface portion 25 as a surface portion facing the first surface portion 21 and spaced apart from the first surface portion 21, and a sidewall portion 24 provided at an outer peripheral portion of each of the first surface portion 21 and the second surface portion 25 and connecting or supporting the first surface portion 21 and the second surface portion 25 spaced apart from each other.

More specifically, as illustrated in FIG. 2, the housing 20 is constituted by coupling a first housing 23 and a second housing 27. The first housing 23 includes the first surface portion 21 and a first sidewall portion 22 forming a part of the sidewall portion 24 (see FIGS. 1A and 1B) provided at the outer peripheral portion of the first surface portion 21. The second housing 27 includes the second surface portion 25 and a second sidewall portion 26 forming a part of the sidewall portion 24 (see FIGS. 1A and 1B) provided at the outer peripheral portion of the second surface portion 25.

Note that the housing 20 is formed with a resin material such as polypropylene, polyethylene terephthalate, and ABS resins.

As illustrated in FIGS. 2 and 3, the rotary apparatus 10 includes, as various parts to be accommodated in the housing 20 (see FIGS. 1A and 1B), a motor 30 and a plurality of gears 60 including an output gear 50 for mechanically outputting the rotation of the motor 30 to the outside.

In addition, as illustrated in FIGS. 2 and 3, the rotary apparatus 10 further includes, as various parts to be accommodated in the housing 20 (see FIGS. 1A and 1B), a sensor 70 that detects a rotation angle of the output gear 50, three first connection terminals 72 disposed on or above a base portion 71 of the sensor 70 for obtaining a rotation angle signal corresponding to the rotation angle, two second connection terminals 35 disposed on or above the base portion 71 of the sensor 70 and electrically connected to the motor 30, and a flexible wiring board 80 (see FIG. 3) for electrically connecting the two motor terminals (not shown) and second connection terminals 35 of the motor 30.

(Motor)

The motor 30 is a drive unit for rotating the output gear 50. In the present embodiment, a DC motor is used as the motor 30.

As illustrated in FIG. 3, the motor 30 includes a main body portion 31 having a quadrangular prism outer shape with curved corner portions, a rotary axis (not shown) derived from a first end surface 31a of the main body portion 31 and having a worm gear 41, and a pair of motor terminals (not shown) for power supply located on an opposite side of the first end surface 31a of the main body portion 31 and provided so as to project outward from a second end surface 31b facing the first end surface 31a. The worm gear 41 is fixed to the rotary axis.

The rotary axis is fixed to the motor.

(Transmission Gear)

As illustrated in FIGS. 2 and 3, the plurality of gears 60 includes a transmission gear 40. The transmission gear 40 is a gear for transmitting the rotation of the rotary axis (not shown) of the motor 30 to the output gear 50 at a predetermined gear ratio. In the present embodiment, three gears (a worm gear 41, a first two-stage gear 42, and a second two-stage gear 43) are used as the transmission gear 40.

More specifically, as illustrated in FIG. 2, the transmission gear 40 includes a worm gear 41 fixed to a rotary axis (not shown) of the motor 30, a first two-stage gear 42, and a second two-stage gear 43. The first two-stage gear 42 includes a gear 42a having a large diameter meshing with the worm gear 41 and a gear 42b having a small diameter. The second two-stage gear 43 includes a gear 43a having a large diameter meshing with the gear 42b having a small diameter of the first two-stage gear 42 and a gear 43b having a small diameter (see FIG. 3) meshing with the output gear 50.

Note that, in the present embodiment, the first two-stage gear 42 and the second two-stage gear 43 are used so as to transmit the rotation of the rotary axis (not shown) of the motor 30 to the output gear 50 by adjusting the gear ratio using a limited space. However, another design may be used. For example, the second two-stage gear 43 may be omitted, and instead the output gear 50 may be meshed with the gear 42b having a small diameter of the first two-stage gear 42. Yet another design may be used. For example, the first two-stage gear 42 and the second two-stage gear 43 may be omitted, and instead the output gear 50 directly meshes with the worm gear 41.

(Output Gear)

The output gear 50 is a gear meshing with a drive shaft of a louver of an air conditioning system for a vehicle, not shown, such as a car, and outputting the rotation of a rotary axis (not shown) of the motor 30 as a drive force for controlling the drive shaft of the louver.

Thus, as illustrated in FIG. 3, the second surface portion 25 of the second housing 27 includes an opening portion 25a located at a portion corresponding to the center side of the output gear 50 provide access to the output gear 50 from outside. As illustrated in FIG. 1B, the drive shaft of the louver, not shown, is capable of being engaged with an engaging portion 51 of the output gear 50 through the opening portion 25a.

Note that the present embodiment is not limited to an embodiment in which the drive shaft of the louver, not shown, directly meshes with the output gear 50, but instead a gear interposed between the rotary apparatus 10 and the drive shaft of the louver, not illustrated, may be provided. In this case, the rotary axis of the interposed gear meshes with the output gear 50.

(Sensor)

For example, an air conditioner or the like installed in a car is provided with a louver.

In order to perform drive control on the louver, not shown, to a predetermined state, it is necessary to control the rotation angle of the output gear 50. The sensor 70 is a sensor for detecting the rotation angle of the output gear 50 to control the rotation angle of the output gear 50.

Then, rotation of the motor 30 is controlled based on the rotation angle of the output gear 50 detected by the sensor 70, whereby the output gear 50 is rotated such that the louver, not shown, is in a predetermined state.

In the present embodiment, a rotary resistive position sensor is used as the sensor 70. As illustrated in FIGS. 2 and 3, the sensor 70 includes three first connection terminals 72 for input and output to obtain a signal of a rotation angle corresponding to a rotation angle of the output gear 50, a sensor board 73, a rotary body (not shown), a base portion 71, and a cover portion 74. A resistor is printed at the sensor board 73 and is electrically connected to the first connection terminals 72. A rotary body (not shown) has a conductive brush, not shown, in contact with the resistor and rotates integrally with the output gear 50 detecting the rotation angle. The above components are arranged at the base portion 71. The cover portion 74 is disposed at a position corresponding to the rotary body, not shown, and forms a sensor housing together with the base portion 71.

The three first connection terminals 72 for the sensor 70 to obtain the rotation angle signal are arranged and fixed to the base portion 71. Also, two second connection terminals 35 to be electrically connected to each of the two motor terminals (not shown) of the motor 30 via a flexible wiring board 80 (see FIG. 3) are arranged and fixed to the base portion 71.

The first connection terminals 72 and the second connection terminals 35 are collectively arranged and fixed to the base portion 71 of the sensor 70. Thus the space may be used effectively and the size of the rotary apparatus 10 may be small.

In addition, the first connection terminals 72 and the second connection terminals 35 are arranged on the base portion 71. The first connection terminals 72 and the second connection terminals 35 can be prevented from contacting with other parts accommodated in the housing 20 (see FIG. 1). Thus the reliability is further improved.

Further, because the base portion 71 has a simple shape, even if a structure that the first connection terminals 72 and the second connection terminals 35 are arranged and fixed is provided, cost of a mold or the like for molding the base portion 71 may not increase.

On the other hand, the housing 20 has a structure for arranging various parts. Thus, if the structure that the first connection terminals 72 and the second connection terminals 35 are arranged and fixed is provided, the mold or the like for molding the housing 20 (first housing 23 and second housing 27) becomes complicated. Thus, the cost of the mold or the like increases, and results in an increase of the cost for manufacturing the housing 20.

Therefore, as in the present embodiment, by arranging and fixing the first connection terminals 72 and the second connection terminals 35 to the base portion 71 of the sensor 70, the manufacturing cost can be reduced.

In addition, as illustrated in FIG. 2, in the present embodiment, the second connection terminals 35 are arranged in the base portion 71 so as be located closer to the motor 30 than the first connection terminals 72. Accordingly, the wiring distance between the second connection terminals 35 and the motor terminals (not shown) of the motor 30 can be shortened, and the electrical wiring between the second connection terminals 35 and the motor terminals (not shown) of the motor 30 can be simplified.

(First Connection Terminals and Second Connection Terminals)

The first connection terminals 72 and the second connection terminals 35 are connection terminals connected to an external connector connected to the rotary apparatus 10.

The three first connection terminals 72 are electrically connected to a conductive portion, not shown, of the sensor board 73 for detecting the rotation angle of the output gear 50. The two second connection terminals 35 are electrically connected to two motor terminals (not shown) as power terminals of the motor 30 via a flexible wiring board 80 to be described later.

As illustrated in FIGS. 2 and 3, the second connection terminal 35 has a part on the distal end side connected to an external connector and a part on one end side opposite to the distal end side. The part on one end side is a bending portion bent in a direction away from the base portion 71. Thus the second connection terminal 35 includes a connection portion 35*a* extending in a direction away from the base portion 71. By providing the connection portion 35*a* in the second connection terminal 35, as described later, the reliability of electrical connection to the flexible wiring board 80 can be improved.

(Flexible Wiring Board)

As illustrated in FIG. 3, the flexible wiring board 80 is roughly divided into three surface portions. Specifically, the flexible wiring board 80 includes a first surface portion 81 on one end side connecting to the second connection terminal 35, a second surface portion 82 on another end side connecting to a motor terminal (not shown) of the motor 30, and an intermediate surface portion 83 connecting the first surface portion 81 and the second surface portion 82.

The first surface portion 81 includes two first engagement holes 81*a* configured to engage with the connection portions 35*a* of the two second connection terminals 35, respectively. The second surface portion 82 includes two second engagement holes 82*a* configured to engage with a pair of motor terminals (not shown) of the motor 30, respectively.

Accordingly, by soldering and engaging the connection portions 35*a* of the two second connection terminals 35 with the two first engagement holes 81*a* of the first surface portions 81, electrical connection can be ensured. Thus, a connection failure between the connection portions 35*a* and the two first engagement holes 81*a* can be suppressed.

Likewise, by soldering and engaging the second engagement holes 82*a* of the second surface portions 82 with the pair of motor terminals (not shown) of the motor 30, electrical connection can be ensured. Thus, a connection failure between the second engagement holes 82*a* and the pair of motor terminals (not shown) of the motor 30 can be suppressed.

Note that the second connection terminals 35 and the motor terminals (not shown) of the motor 30 may be connected with a lead wire.

A flexible wiring board is preferable since the flexible wiring board is easier to handle and is less likely to be damaged than the lead wire, and thus has good connection workability.

Therefore, as in the present embodiment, by using the flexible wiring board 80, wiring workability is improved and thus can reduce the manufacturing cost.

In addition, as illustrated in FIG. 3, in the present embodiment, the intermediate surface portion 83 connecting the first surface portion 81 and the second surface portion 82 of the flexible wiring board 80 includes a replicated portion 83*a* disposed such that the first surface portion 81 is substantially perpendicular to the second surface portion 82.

The replicated portion 83*a* is also configured to have a folded structure.

For example, in a case where the second connection terminal 35 is linearly connected to a motor terminal (not shown) of the motor 30 with the flexible wiring board 80, vibration of the motor 30 or the second connection terminal 35 due to vibration of the vehicle causes tensile stress or the like to be easily applied to a connection portion between the flexible wiring board 80 and the second connection terminal 35 or a connection portion between the motor terminal (not shown) and the flexible wiring board 80. As a result, connection failure may occur, or disconnection or the like of the flexible wiring board 80 may easily occur.

In light of this, in the present embodiment, the replicated portion 83a is interposed between the second connection terminals 35 and the motor terminals (not shown) of the motor 30. The replicated portion 83a has a folded structure that allows an angle (bending angle) formed by the first surface portion 81 and the second surface portion 82 to be changed in response to vibrations or the like and that exhibits a spring property.

With such a structure, the replicated portion 83a having the folded structure deforms such that the bending angle changes in response to vibrations or the like and exhibits a spring property. Therefore, it is possible to prevent tensile stress or the like from being applied to the connection portion between the second connection terminals 35 and the flexible wiring board 80 or the connection portion between the motor terminals (not shown) and the flexible wiring board 80, and an occurrence of connection failure can be prevented, and also an occurrence of disconnection or the like of the flexible wiring board 80 itself can be suppressed.

Note that the replicated portion 83a may be formed by bending only once with no folded structure. With such a replicated portion, an extra wiring length can be provided, and an effect of tensile stress or the like can be reduced in comparison with a case of linear wiring.

However, as in the present embodiment, it is more preferable to use a replicated portion 83a having a folded structure so as to be less susceptible to the effect of tensile stress.

Therefore, as in the present embodiment, by providing the replicated portion 83a having a folded structure in the flexible wiring board 80, the reliability of the rotary apparatus 10 or the like can be improved.

Note that, as in the present embodiment, with configuration that the replicated portion 83a having a folded structure is provided in the intermediate surface portion 83, there is an effect of improving an effect of workability during soldering. This is because, as illustrated in FIGS. 2 and 3, a conductive pattern formed on the flexible wiring board 80 is provided on a side at which the connection portion 35a is projecting when the connection portion 35a of the second connection terminal 35 is inserted into the first engagement hole 81a, and on a side at which the motor terminal (not shown) is projecting when the motor terminal (not shown) is inserted into the second engagement hole 82a (see FIG. 3).

(Housing)

As described above, the housing 20 is formed by coupling the first housing 23 and the second housing 27.

By examining the noise state at each portion of the housing 20, it has been found that vibration at the position of the first surface portion 21 and the second surface portion 25 corresponding to the output gear 50 is greater than vibration at the position of the other portions and thus causes more noise.

It is considered that the positions of first surface portion 21 and the second surface portion 25 facing the output gear 50 are positions easily to cause vibration leading to noise. The reasons are as follows. The output gear 50 has a large size and is not capable of contacting other members. The output gear 50 is disposed at the positions of first surface portion 21 and the second surface portion 25. There is no structure suppressing a vibration.

In light of this, a plurality of vibration damping parts 90 are provided at the positions of the first surface portion 21 and the second surface portion 25 corresponding to the output gear 50 in such a manner that the rotation of the output gear 50 is not blocked, and thereby to suppress noise from occurring in the housing 20. The vibration damping part 90 will be specifically described below.

Figure 4:
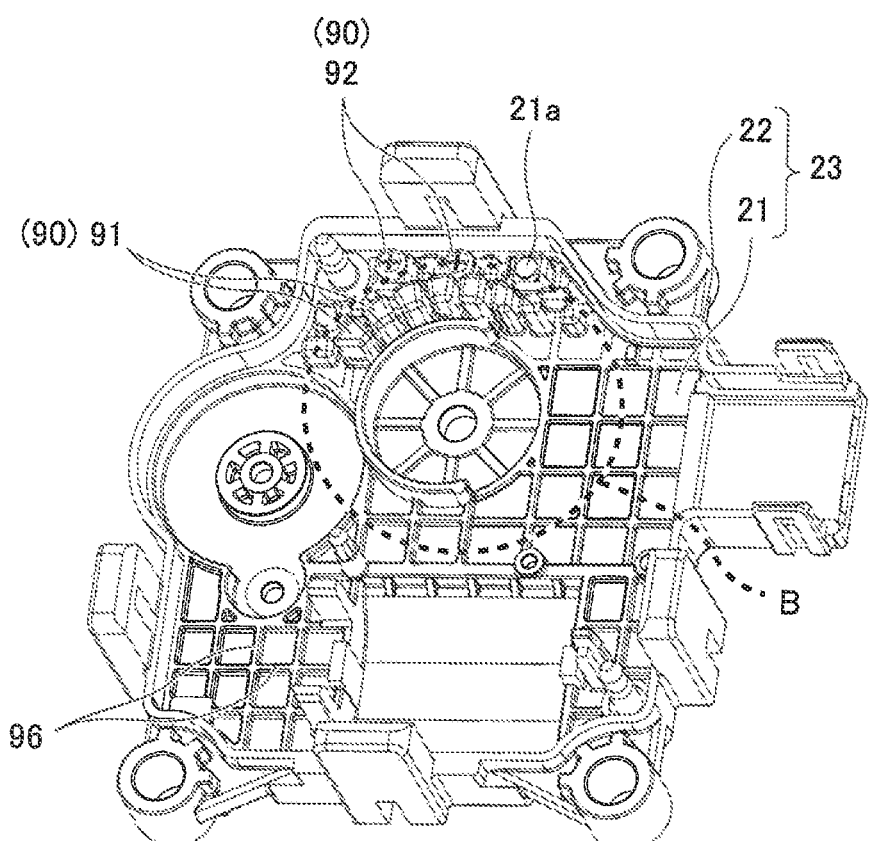
FIG. 4 is a perspective view inside the first housing of the first embodiment of the present disclosure.

FIG. 4 is a perspective view inside the first housing 23.

Note that in FIG. 4, a region where the output gear 50 is located is schematically indicated by a dotted line frame B.

(First Vibration Damping Part)

As illustrated in FIG. 4, a first vibration damping part 90 is provided at a position corresponding to the output gear 50 (around the dotted line frame B) on the first surface portion 21, serving as one surface portion of the housing 20 (see FIGS. 1A and 1B). The first vibration damping part 90 serves as a projecting portion and includes a plurality of protruded portions 91 formed to project into the housing 20 from the first surface portion 21, serving as the one surface portion, and cantilevered on the first surface portion 21.

The plurality of protruded portions 91 are arranged side by side in a direction of the rotary axis of the motor 30 or in a direction crossing the rotary axis thereof.

The protruded portion 91 is, in a thickness direction of the housing 20, formed to be longer than a rib 96 formed in the housing 20, and has a rod-like outer shape.

Note that a plurality of ribs extending in the direction of the rotary axis of the motor 30 or in the direction crossing the rotary axis is formed on an inner surface of the first surface portion 21 facing the second surface portion 25.

Thus, by providing the projecting portion including the plurality of protruded portions 91 in the first surface portion 21 of the housing 20, the weight of a part of the first surface portion 21 serving as the one surface portion of the housing 20 (see FIGS. 1A and 1B) corresponding to the output gear 50 (around the dotted line frame B) is increased.

Thus, even if the first surface portion 21 of the housing 20 vibrates, the amplitude of the vibration is rapidly damped with the elapse of time and thus noise emitted from the housing 20 can be suppressed, or noise can be reduced by suppressing resonance or the like with vibration at other portions of the housing 20 other than the first surface portion 21.

As is apparent from the dotted line frame B, the projecting portion including the plurality of protruded portions 91 is located inside the output gear 50.

As illustrated in FIGS. 2 and 3, the output gear 50 includes a recessed portion 52 formed in a surface facing the first surface portion 21.

The recessed portion 52 accommodates the projecting portion while avoiding contact with the projecting portion including the plurality of protruded portions 91.

The projecting portion including the plurality of protruded portions 91 is formed to project from the first surface portion 21 such that a part on the distal end side of the projecting portion including the plurality of protruded portions 91 is located inside the recessed portion 52.

Note that a predetermined gap is provided between the recessed portion 52 and the projecting portion. Such a recessed shape of the recessed portion 52 and the gap between the recessed portion 52 and the projecting portion serve to avoid contact the recessed portion 52 and the projecting portion.

Note that, rather than the projecting portion including the plurality of protruded portions 91, the projecting portion may be formed as a single protruded portion obtained by integrally connecting the plurality of protruded portions 91.

Such a projecting portion formed as a single integrally connected protruded portion is susceptible to deformation when molding the housing 20 (more specifically, the first housing 23). Thus, like the present embodiment in a case where the projecting portion is integrally formed in the housing 20 (more specifically, the first housing 23), the projecting portions may be provided as a plurality of protruded portions 91.

The projecting portion may be a weight.

(Second Vibration Damping Part)

In the present embodiment, in addition to the above described first vibration damping part 90, a second vibration damping part 90 is also provided near the first vibration damping part 90.

More specifically, as illustrated in FIG. 4, a plurality of screw holes 21a formed in the first surface portion 21, serving as one surface portion of the housing 20 (see FIGS. 1A and 1B), are formed at positions located closer to the first sidewall portion 22 in proximity with the first vibration damping part 90 having the projecting portion including the plurality of protruded portions 91.

A plurality of metal screws 92 attached by being screwed into the screw holes 21a are attachment members attached to the first surface portion 21 of the housing 20.

A second vibration damping part 90 including the attachment members is provided on the first surface portion 21 of the housing 20.

The plurality of screw holes 21a and screws 92 are provided on an inner surface or an outer surface of the surface portion.

As used herein, the term "inner surface" refers to a surface facing the inside of the housing 20 and the term "outer surface" refers to a surface facing the outside of the housing 20.

The screws 92 are formed with a metal material such as iron and aluminum.

The unit mass of the material of the second vibration damping part 90 including the plurality of metal screws 92 attached as described above is greater than the unit mass of the housing 20 formed with a resin material, and thus increases weight and can reduce a noise in the similar manner as the first vibration damping part 90 described above.

Note that hereinbefore, the first vibration damping part 90 has been described as the projecting portion including a plurality of protruded portions 91 formed to project into the housing 20 from the first surface portion 21 serving as one surface portion, but the first vibration damping part 90 may be configured as an attachment member by providing the plurality of protruded portions 91 by screw connection in the same manner as the second vibration damping part 90.

Note also that the first vibration damping part 90 and the second vibration damping part 90 are provided at the first surface portion 21, but the first vibration damping part 90 and the second vibration damping part 90 may be provided at the second surface portion 25, or the first and second vibration damping parts 90 may be provided at both the first and second surface portions.

Thus, with the vibration damping part 90 being configured as the attachment member, the material selection range can be widened. Accordingly, the size of the vibration damping part 90 for obtaining a necessary weight can be reduced, and by omitting some of the attachment members while checking the noise state, noise can be suppressed with a minimum increase in the weight.

(Third Vibration Damping Part)

In the present embodiment, in addition to the above described first and second vibration damping parts 90, a third vibration damping part 90 is provided.

More specifically, as illustrated in FIG. 3, the third vibration damping part 90 is provided at the second surface portion 25, serving as another surface portion of the housing 20 (see FIGS. 1A and 1B).

As described above, the second surface portion 25 includes an opening portion 25a allowing access to the output gear 50 from outside. As illustrated in FIG. 3, the opening portion 25a includes a tubular wall portion 93 serving as a tubular first wall portion to be described later and a tubular second wall portion (hereinafter referred to as an opening wall portion) 25aa provided inside the housing 20 (see FIGS. 1A and 1B) and formed along an outer periphery of the opening portion 25a.

Note that the opening portion 25a is provided at a position facing the output gear 50. The output gear 50 can contact the outside through this opening portion 25a.

The third vibration damping part 90 surrounds the opening portion 25a along the outer periphery of the opening portion 25a.

The third vibration damping part 90 is formed to project into the housing 20 (see FIGS. 1A and 1B) from the second surface portion 25 as the tubular wall portion 93 provided at a position spaced apart from the opening wall portion 25aa.

The tubular wall portion 93 surrounds the opening wall portion 25aa.

The third vibration damping part 90 including the thus formed tubular wall portion 93 also increases, in the similar manner as the first and second vibration damping parts 90, the weight at the position of the second surface portion 25 serving as another surface portion of the housing 20 (see FIGS. 1A and 1B) corresponding to the output gear 50. Thus, even if vibration occurs, the vibration is rapidly dampened and resonance or the like is less likely to occur, thereby reducing noise.

In addition, as illustrated in FIG. 3, in the present embodiment, a plurality of ribs 93a connecting the annular opening wall portion 25aa extending circumferentially and the annular tubular wall portion 93 extending circumferentially are provided between the opening wall portion 25aa and the tubular wall portion 93.

By providing such ribs 93a, weight can be increased, resonance or the like can be suppressed, and noise can be reduced.

In addition, by providing the ribs 93a, the structure of the housing 20 can be strengthened, such as an increase in the bending rigidity of the housing 20. In this respect as well, vibration can be damped and noise can be reduced.

(Fourth Vibration Damping Part and Fifth Vibration Damping Part)

The above described first to third vibration damping parts 90 are the vibration damping parts 90 provided inside the housing 20 (see FIGS. 1A and 1B). Whereas in the present embodiment, a vibration damping part 90 is also provided outside the housing 20. Hereinafter, the fourth vibration damping part 90 and the fifth vibration damping part 90 will be specifically described in this order.

As illustrated in FIG. 1A, the fourth vibration damping part 90 (see a crosshatched portion) is provided at a position corresponding to the output gear 50 of the first surface portion 21 serving as one surface portion of the housing 20.

The fourth vibration damping part 90 is configured as an increased thickness portion 94 formed so as to be thicker toward outside the housing 20 than the basic thickness of the first surface portion 21, thereby to increase the weight, strengthen the structure, and reduce noise.

Note that the increased thickness portion 94 may be configured such that at least a part of the increased thickness portion 94 is included in a region where the range of the output gear 50 disposed in the housing 20 is projected on the first surface portion 21. However, as in the present embodiment, by providing the increased thickness portion 94 to reach the sidewall portion 24, noise can be further reduced.

Likewise, as illustrated in FIG. 1B, the fifth vibration damping part 90 (see the crosshatched portion) is provided at a position corresponding to the output gear 50 also in the second surface portion 25 serving as another surface portion of the housing 20.

Like the fourth vibration damping part 90, the fifth vibration damping part 90 is configured as an increased thickness portion 95 formed so as to be thicker toward outside the housing 20 than the basic thickness of the second surface portion 25, thereby to increase the weight, strengthen the structure, and reduce noise.

Note that like the increased thickness portion 94, the increased thickness portion 95 may be configured such that at least a part of the increased thickness portion 95 is included in a region. The region is the range of the output gear 50 disposed in the housing 20 is projected on the second surface portion 25. However, as in the present embodiment, by providing the increased thickness portion to extend so as to reach the sidewall portion 24, noise can be further reduced.

Regarding the thickness of the increased thickness portion 94 and the increased thickness portion 95, how much the thickness should be increased with respect to the basic thickness is determined by considering the degree of noise reduction. For example, preferably, the thickness is increased by 20% or more of the basic thickness.

By comparing the noise states of the above described first to fifth vibration damping parts 90 with the noise states without the vibration damping parts 90, a sound pressure drop of 1 dB or more was confirmed in the sound of frequency having the highest sound volume.

Note that, in the present embodiment, the first to fifth five vibration damping parts 90 are provided, but it is not necessarily required to provide all the five vibration damping parts 90.

For example, from the viewpoint of energy saving and the like, it may be necessary for the weight of the parts used for a vehicle such as a car to be reduced on a gram basis, and thus some of the vibration damping parts 90 may be excluded considering the balance between sound decrease and weight increase.

Second Embodiment

Figure 5C:
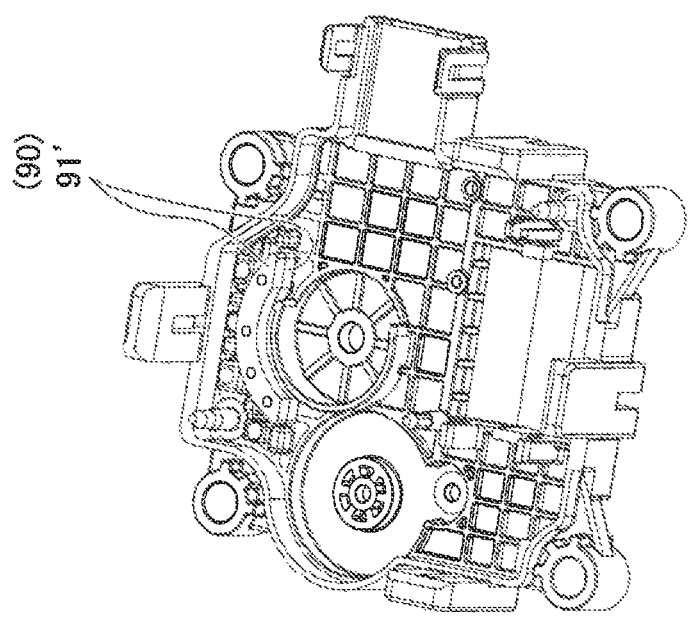
FIG. 5C is a perspective view illustrating a state in which a plurality of attachment members are attached on the first housing for illustrating the second embodiment of the present disclosure.
Figure 5B:
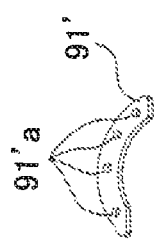
FIG. 5B is a perspective view illustrating an attachment member constituting a vibration damping part of the second embodiment in place of a first vibration damping part of the first embodiment for illustrating the second embodiment of the present disclosure.
Figure 5A:
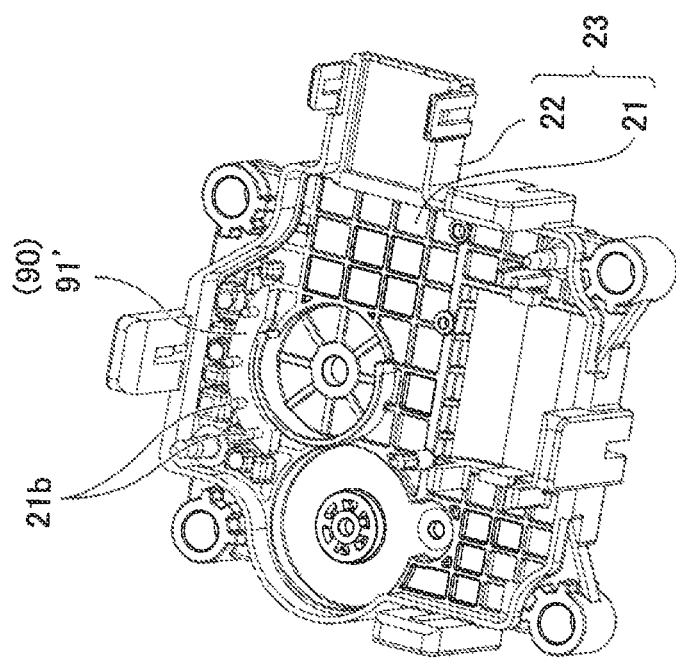
FIG. 5A is a perspective view inside the first housing for illustrating a second embodiment of the present disclosure.

FIGS. 5A to 5C are diagrams for illustrating a second embodiment. Hereinafter, the second embodiment will be described with reference to FIGS. 5A to 5C.

The second embodiment has the same basic configuration as the basic configuration of the first embodiment except the configuration of the first vibration damping part 90.

Thus, the following description will focus mainly on the components different from the components of the first embodiment, and the description of the components same as or similar to the components of the first embodiment may be omitted.

FIG. 5A is a perspective view viewing inside the first housing 23. FIG. 5B is a perspective view illustrating an attachment member 91' forming the vibration damping part 90 of the second embodiment replaced with the first vibration damping part 90 of the first embodiment. FIG. 5C is a perspective view illustrating a state in which a plurality of attachment members 91' are attached on the first housing 23.

As illustrated in FIG. 5A, the first surface portion 21 of the first housing 23 includes a plurality of rod-like projections 21b projecting into the housing 20 (see FIGS. 1A and 1B).

As illustrated in FIG. 5B, a crescent-shaped attachment member 91' formed with a metal material and forming the vibration damping part 90 includes a plurality of press-fitting holes 91a'. The rod-like projection 21b is press-fitted into the plurality of press-fitting holes 91a'.

Then, the attachment member 91' is attached on the first surface portion 21 so as to press-fit the rod-like projection 21b into the press-fitting hole 91a' of the attachment member 91', thereby implementing the vibration damping part 90 configured as a projecting portion cantilevered on the first surface portion 21 in the similar manner as the first vibration damping part 90 of the first embodiment (see FIG. 4).

Thus, the weight to be added can be adjusted by increasing the number of attachment members 91' as illustrated in FIG. 5C or reducing the number of attachment members 91' as illustrated in FIG. 5A.

In other words, an appropriate amount of weight can be added considering the balance of effect between sound decrease and weight increase.

Note that the outer shape of the attachment member 91' is close to the outer shape of the connected plurality of protruded portions 91 of the first embodiment, and thus the attachment member 91' can be accommodated in the recessed portion 52 (see FIG. 2) of the output gear 50 described in the first embodiment without contacting the output gear 50.

The above described rotary apparatus 10 is used in an air conditioning system for a vehicle such as a car. Thus, the following brief description will focus on an example for use in a vehicle air conditioning system.

Figure 6:
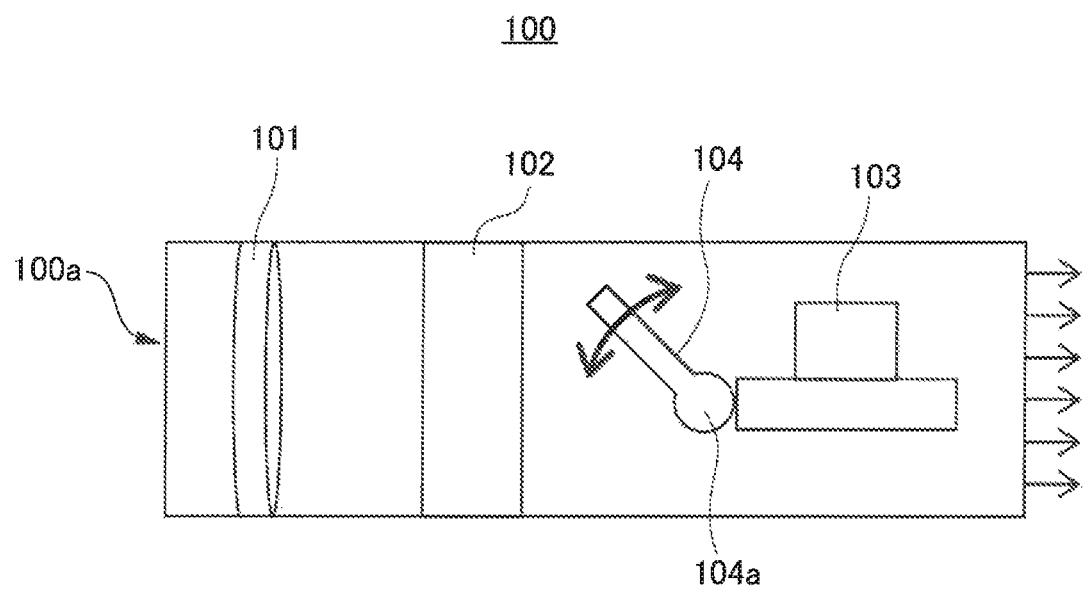
FIG. 6 is a schematic view for illustrating an air conditioning system including the rotary apparatus according to the embodiments of the present disclosure.
Figure 7:
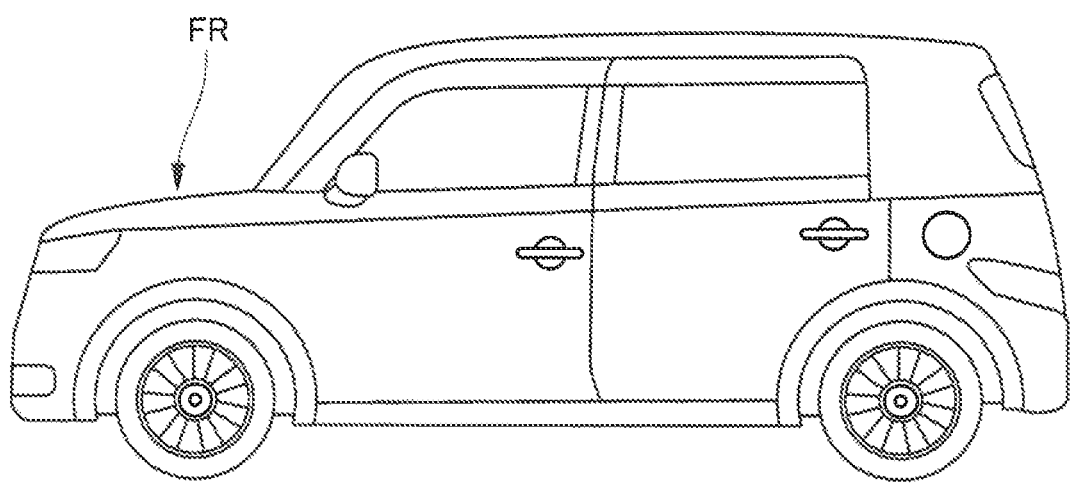
FIG. 7 is a diagram illustrating a vehicle including the air conditioning system illustrated in FIG. 6.

FIG. 6 is a schematic view for illustrating an air conditioning system 100 including the rotary apparatus 10 according to the present embodiment. FIG. 7 is a diagram illustrating a vehicle including the air conditioning system 100 in FIG. 6.

As illustrated in FIG. 6, the air conditioning system 100 includes a blower fan 101, an evaporator 102, a heater 103, and a louver 104, which are disposed in a front portion FR (see FIG. 7) of the vehicle.

More specifically, the blower fan 101 is disposed on a side of a suction port 100a of the air conditioning system 100. The evaporator 102 for cooling the air sent out from the blower fan 101 is disposed on the downstream side in the air flow direction.

Further, the heater 103 is disposed closer to the downstream side in the air flow direction than the evaporator 102 and the louver 104 is interposed between the evaporator 102 and the heater 103. The louver 104 controls the amount of air flowing from the evaporator 102 to the heater 103 so as to adjust the air to an appropriate temperature.

Then, the air adjusted to an appropriate temperature passes through a duct or the like and is supplied into the vehicle from an air outlet provided in the vehicle. In the above described air conditioning system 100, for example, a rotary axis 104a of the louver 104 is connected to an engaging portion 51 (see FIGS. 1A and 1B) of the output gear 50 of the above described rotary apparatus 10.

As described above, the rotary apparatus 10 controls the rotation of the louver 104 to a predetermined state (See double arrow in FIG. 6).

Note that the above described configuration is merely an example of the rotary apparatus 10 in the air conditioning system 100. For example, the air conditioning system 100 may switch the air flow path (duct route) between a case in which air is circulated within the vehicle and a case in which air is introduced into the vehicle from outside. In this case, the louver is provided in the switching portion.

Therefore, the rotary apparatus 10 may also be suitably used for controlling the louver provided in the switching portion.

Hereinbefore, the present disclosure has been described with reference to the embodiments, but the present disclosure is not limited to the embodiments.

In the above embodiments, the sensor 70 is disposed so as to detect the rotation angle of the output gear 50, but the detection of the rotation angle is not limited to the detection of the output gear 50.

For example, the relationship between the rotation angle of one of a plurality of transmission gears 40 and the drive state of a louver, not shown, is determined so as to detect the rotation angle of the gear. Then, based on the rotation angle, rotation control can be performed on the motor 30 to perform drive control on the louver, which is not shown.

Accordingly, the sensor 70 for detecting the rotation angle may be disposed so as to detect the rotation angle of any one of the transmission gears 40.

In addition, in the above embodiments, a rotary resistive position sensor is used as the sensor 70, but the sensor 70 is not limited to the rotary resistive position sensor and may be a non-contact rotary position sensor.

Note that the resistive position sensor has a structure in which the conductive brush physically firmly contacts the resistor and is less susceptible to detection failure or the like due to the effects of vehicle vibration. Thus, the rotary resistive position sensor is suitable for the sensor 70.

The vibration damping part may be disposed in the housing such that the center of gravity in the first surface portion 21 or the second surface portion 25 of the housing 20 is positioned closer to the vibration damping part with respect to the center of the first surface portion 21 or the second surface portion 25.

As used herein, the center of the first surface portion 21 or the second surface portion 25 refers to the position of the first surface portion 21 or the second surface portion 25 corresponding to the intersection of the diagonal lines of the four attachment portions A, B, C, and D of the housing 20 in the thickness direction of the housing 20.

The above embodiments may be appropriately applied as the vibration damping part because the center of gravity is positioned closer to the vibration damping part.

Note that the first vibration damping part 90 may be disposed in the second surface portion 25.

Note also that the first vibration damping part 90 as the weight may be provided in the first surface portion 21 and/or the second surface portion 25 so that a part of the first surface portion 21 and the second surface portion 25 having the first vibration damping part 90 may be heavier than the other parts of the first surface portion 21 and the second surface portion 25.

Note also that the first vibration damping part 90 may be provided in the first surface portion 21 and/or the second surface portion 25 so that the bending rigidity (Young's modulus) of a part of the first surface portion 21 and/or the second surface portion 25 having the first vibration damping part 90 may be greater than the bending rigidity (Young's modulus) of the other parts of the first surface portion 21 and the second surface portion 25.

Note also that the first vibration damping part 90 may be positioned closer to a fitting portion E or a fitted portion F or may be disposed at a position adjacent to the fitting portion E or the fitted portion F with respect to the center of the housing 20.

As used herein, the center of the housing 20 refers to the intersection of the diagonal lines of the four attachment portions A, B, C, and D of the housing 20 in the thickness direction of the housing 20.

The motor may include, for example, a stator, a rotor, a commutator, a brush, and a bracket having a brush therein, none of which is illustrated in the drawings.

Thus, it will be apparent that various modifications can be made without departing from the spirit and scope of the present disclosure. Such various modifications made within the spirit and scope of the present disclosure are also included in the technical scope of the present disclosure. This is apparent to those skilled in the art from the scope of claims.

What is claimed is:

1. A rotary apparatus comprising:
a motor;
a plurality of gears including an output gear; and
a housing accommodating the plurality of gears and the motor, wherein
the housing includes
a first surface portion,
a second surface portion opposing the first surface portion and spaced apart from the first surface portion, and
wherein:
one surface portion of the first surface portion and the second surface portion includes an opening part opposing the output gear and a vibration damping part,
another surface portion of the first surface portion and the second surface portion includes a vibration damping part,
the vibration damping part of the one surface portion includes protruded portions projecting into the housing from the one surface portion, and
the vibration damping part of the another surface portion includes attachment members attached at the another surface portion.

2. The rotary apparatus according to claim 1, wherein
the vibration damping part of the another surface portion includes protruded portions,
the attachment members include the attachment member attached at the another surface portion via the protruded portions.

3. The rotary apparatus according to claim 1, wherein
the attachment members are screws attached at the screw holes formed at the protruded portions.

4. The rotary apparatus according to claim 1, wherein
the vibration damping part of the one surface portion is arranged at an inner face of the one surface portion,
the vibration damping part of the one surface portion increases a weight of the one surface portion.

* * * * *